US009007898B2

(12) United States Patent
Jain et al.

(10) Patent No.: US 9,007,898 B2
(45) Date of Patent: Apr. 14, 2015

(54) SYSTEM TO SHARE NETWORK BANDWIDTH AMONG COMPETING APPLICATIONS

(75) Inventors: Sushant Jain, Sunnyvale, CA (US); Anand Raghuraman, Campbell, CA (US); Alok Kumar, Fremont, CA (US); Uday Naik, Fremont, CA (US); Aspi Siganporia, Saratoga, CA (US)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 13/018,967

(22) Filed: Feb. 1, 2011

(65) Prior Publication Data

US 2012/0195209 A1   Aug. 2, 2012

(51) Int. Cl.
*H04L 12/26* (2006.01)
*H04L 12/24* (2006.01)
*H04L 12/851* (2013.01)
*H04L 12/927* (2013.01)
*H04L 12/911* (2013.01)

(52) U.S. Cl.
CPC ........ *H04L 41/0896* (2013.01); *H04L 47/2441* (2013.01); *H04L 47/808* (2013.01); *H04L 47/823* (2013.01); *H04L 47/828* (2013.01)

(58) Field of Classification Search
None
See application file for complete search history.

(56) References Cited

U.S. PATENT DOCUMENTS

| | | | |
|---|---|---|---|
| 6,324,184 B1 | 11/2001 | Hou et al. | |
| 7,072,295 B1 * | 7/2006 | Benson et al. | 370/230 |
| 7,848,234 B2 | 12/2010 | McKinnon, III et al. | |
| 8,503,428 B2 | 8/2013 | Bajaj et al. | |
| 2002/0023117 A1 * | 2/2002 | Bernardin et al. | 709/104 |
| 2002/0143952 A1 * | 10/2002 | Sugiarto et al. | 709/227 |
| 2003/0005074 A1 * | 1/2003 | Herz et al. | 709/216 |
| 2003/0081626 A1 | 5/2003 | Naor et al. | |
| 2003/0120934 A1 | 6/2003 | Ortiz | |
| 2004/0192239 A1 | 9/2004 | Nakao et al. | |
| 2007/0041384 A1 * | 2/2007 | Das et al. | 370/395.4 |
| 2007/0223422 A1 | 9/2007 | Kim et al. | |
| 2007/0263625 A1 * | 11/2007 | Engstrand | 370/390 |
| 2008/0037556 A1 * | 2/2008 | Denney et al. | 370/395.42 |
| 2008/0103861 A1 | 5/2008 | Zhong | |
| 2009/0316578 A1 | 12/2009 | Mang et al. | |
| 2010/0071024 A1 | 3/2010 | Eyada | |
| 2010/0172267 A1 * | 7/2010 | Viorel et al. | 370/254 |
| 2010/0220745 A1 * | 9/2010 | Lauwers et al. | 370/468 |
| 2010/0306353 A1 | 12/2010 | Briscoe et al. | |
| 2011/0013506 A1 | 1/2011 | Ishii et al. | |
| 2011/0087765 A1 * | 4/2011 | Musgrave et al. | 709/224 |
| 2011/0096666 A1 | 4/2011 | Davari | |
| 2011/0173327 A1 | 7/2011 | Chen et al. | |
| 2012/0149418 A1 * | 6/2012 | Skubic et al. | 455/509 |

FOREIGN PATENT DOCUMENTS

EP   1919220 A2 *   5/2008

OTHER PUBLICATIONS

ISR dated Sep. 25, 2012 for PCT/US2012/023288.

* cited by examiner

*Primary Examiner* — Kwang B Yao
*Assistant Examiner* — Hardikkumar Patel
(74) *Attorney, Agent, or Firm* — Lerner, David, Littenberg, Krumholz & Mentlik, LLP

(57) ABSTRACT

The present invention pertains to the allocation of bandwidth on a global large scale network. Systems and methods are provided to base bandwidth allocation on the predicted bandwidth demands of the network users. In allocating bandwidth, each user is assigned a user weight value, and is to be allocated bandwidth in proportion to that value. In addition, the bandwidth allocation is enforced so as to ensure that bandwidth allocation policies are maintained.

19 Claims, 9 Drawing Sheets

SYSTEM TO SHARE NETWORK BANDWIDTH AMONG COMPETING APPLICATIONS

BACKGROUND OF THE INVENTION

Large scale networks support a wide variety of applications and services. Such networks may include multiple devices distributed across links in an interconnection network or switch fabric. Each node of the network may include a switch (e.g., a router) or an endpoint (e.g., a host device). Network congestion can occur when a link or node carries too much data so as to cause deterioration in the quality of service. Typically, the effects of network congestion include queuing delay, packet loss, or the blocking of new connections. Congestion across the network can be controlled by protocols, such as the Transmission Control Protocol ("TCP"), which maintains a similar bandwidth for competing connections. TCP also ensures that the overall transmission rates are less than the link capacity.

One of the limitations of TCP is that it focuses on the number of connections being made to an endpoint at any given time. Accordingly, a user of the network can easily access additionally bandwidth by simply implementing additional connections to the network. This practice is becoming increasingly prevalent in larger scale distributed systems where a user's job is spread across many machines. For example, if a first user is running a job on 100 machines and a second user is running a job on 10 machines, the first user may have access to 10 times the bandwidth of the second user. This is not desirable for many networks, as it creates what is considered an unfair allocation of bandwidth.

BRIEF SUMMARY OF THE INVENTION

The present invention relates generally to the management of bandwidth in a network. More specifically, the invention relates to predicting demand for each user in a network, and allocating bandwidth to each user based on a desired bandwidth allocation policy.

One aspect of the invention provides a method of centrally enforcing a bandwidth allocation policy so that each user receives a share of bandwidth in accordance with his or her demand, and so as to prevent users from exceeding their allocated bandwidth. In addition, any bandwidth that is unused by a particular user may be redistributed to other users on the network, thereby allocating bandwidth to uses that need it more.

In another aspect, each user is assigned a particular user weight value, and the allocation of bandwidth to each user will be in proportion to that user's weight value. Weight values can be based on any number of factors, including the priority of the user, the data intensity of the user's work, or the time sensitivity of the user's work. Accordingly, if two users have the same weight value, they will receive equal allocations of bandwidth, provided that they are transmitting data with the same Quality of Service ("QoS") from the same network source to the same network destination.

Another aspect allows for important, business critical traffic to be transmitted without disruption by unexpected and non-critical network transmissions.

In yet another aspect the throttling of bandwidth is achieved by automatic kernel-level traffic shaping at the network's end hosts, coupled with detection of network bottlenecks and application of fairness policies to detect the bottleneck's capacity.

In yet another aspect of the invention the collection of network usage information from the end hosts are aggregated via a central collection hierarchy.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
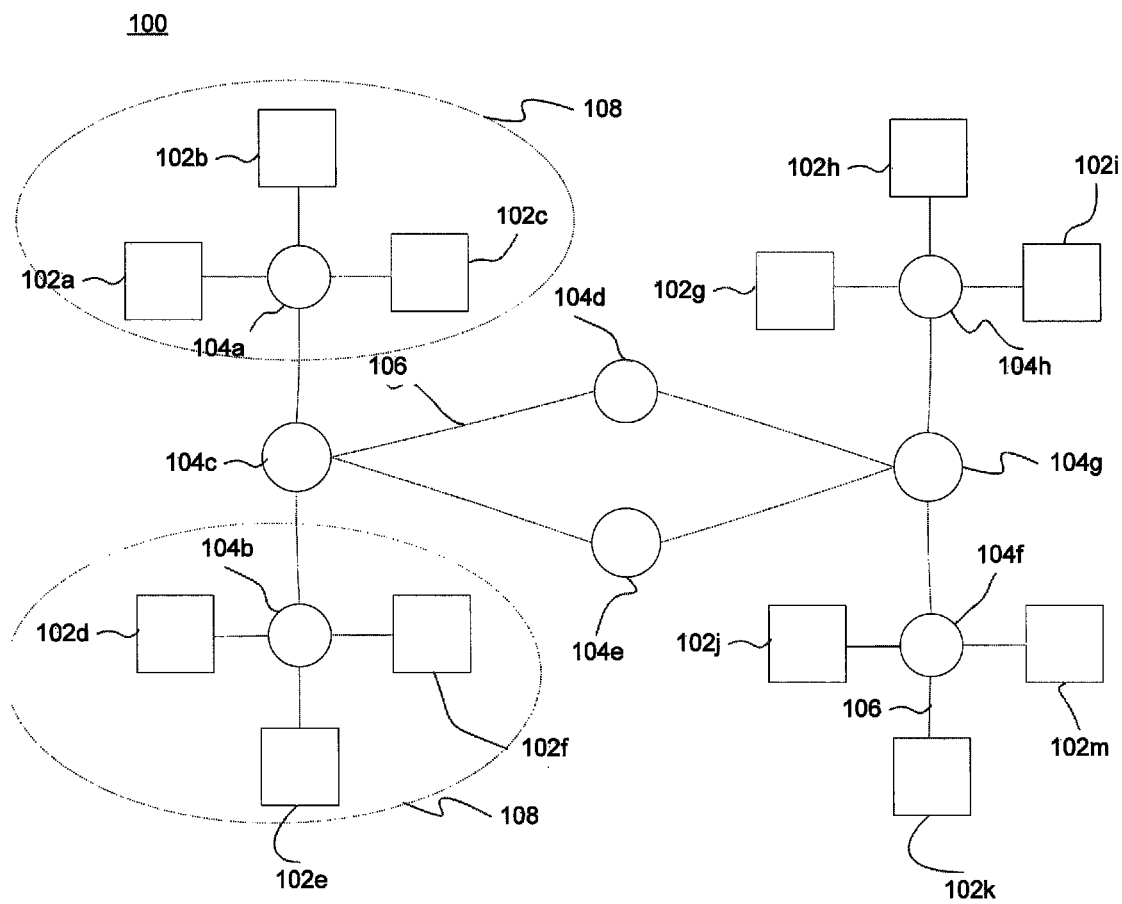
FIG. 1 illustrates an exemplary global network.

FIG. 1 illustrates an exemplary interconnection network 100 for use with aspects of the invention. As shown, the network includes a number of hosts 102, which may be computers such as servers or client devices. The hosts 102 may be coupled to one another through nodes 104 in the network. The hosts 102 may also be coupled to external networks, storage systems, or other devices (not shown). Each node 104 may include a router having logical interfaces with other devices on the network via links 106. Each logical interface can be characterized as having a given capacity in bits per second.

The hosts 102 may be grouped into clusters that will typically share computing resources with one another. In the example provided in FIG. 1, hosts 102a, 102b, and 102c are a network cluster 108. Multiple clusters may operate at the same site or point of presence ("POP"). In FIG. 1, hosts 102a through 102f represent two separate clusters 108 that operate at the same POP. A network path is a sequence of logical interfaces from one point on the network to another, via links 106, while a "PathSet" is a set of multiple paths. PathSets can be used to describe all of the paths that can be taken for data that is transmitted between one network cluster to another. In addition, each path may have a relative weight, indicating the ratio in which network traffic should be split when transmitted along a PathSet having two or more separate paths.

Figure 2:
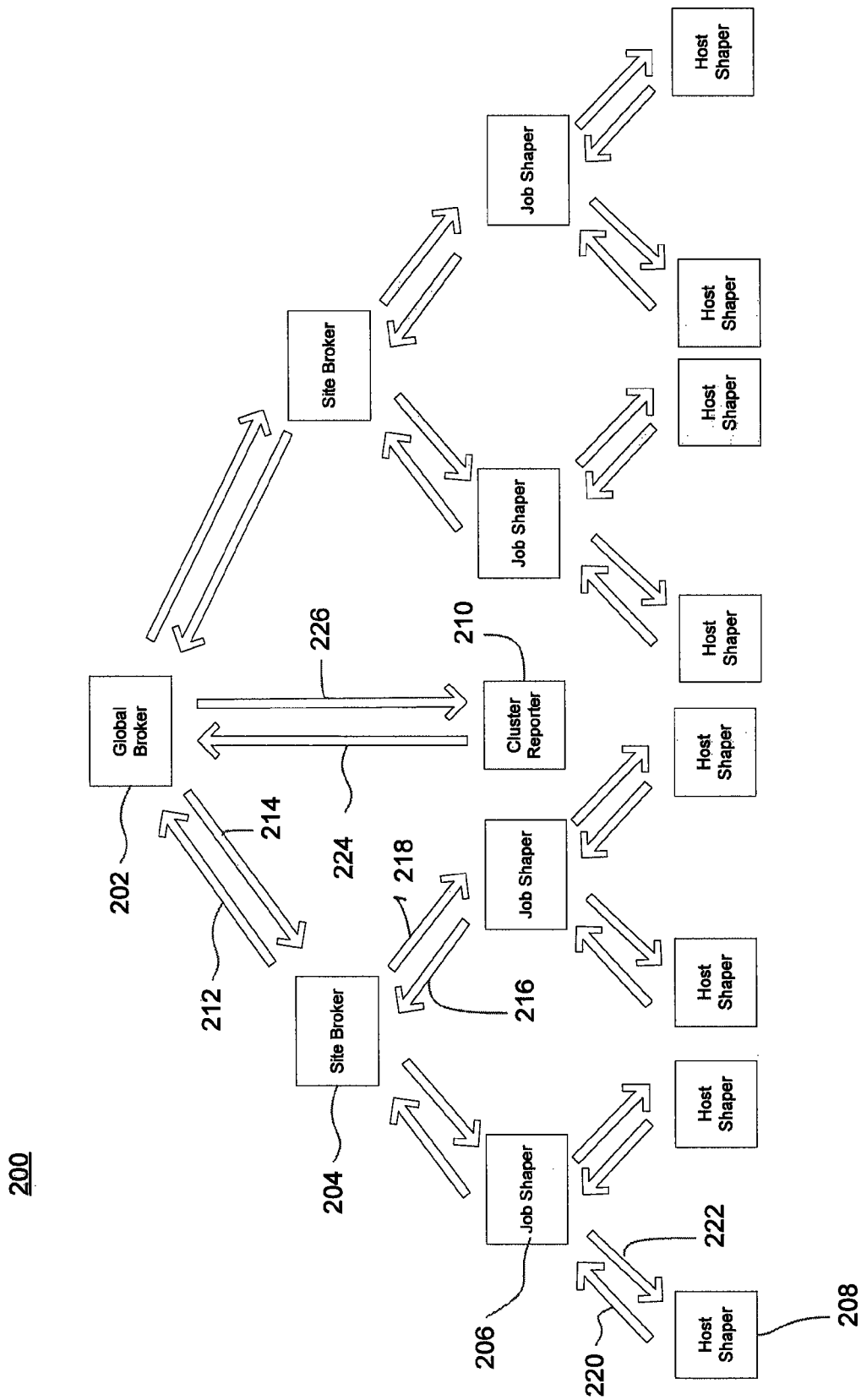
FIG. 2 illustrates a functional component hierarchy in accordance with aspects of the invention.

One exemplary embodiment of the present invention is shown in the architecture 200 of FIG. 2. In this embodiment, a system 200 includes the following components: a global broker 202, site brokers 204, job shapers 206, and host shapers 208. These components can be incorporated into the various hosts 102 of a large scale network, as shown in FIG. 1. The users of the network may include individuals and client devices. In addition, one or more components of the architecture 200 may be incorporated into a single device on the network. For example, a site broker 204, job shaper 206, and host shaper 208 may comprise software modules that reside on a single device having a processor that is capable of performing the functions associated with each of the individual modules.

As shown in the architecture 200 of FIG. 2, the global broker 202 sits at the top of the bandwidth enforcer hierarchy. It is the global broker 202 that is responsible for dividing up the available bandwidth on the network between different network clusters. The global broker 202 receives information relating to bandwidth usage and bandwidth demand from the site brokers 204. The network transmission information provided to the global broker 202 can be provided at a desired granularity. For example, instead of providing bandwidth usage and demand for each device on the network, the site brokers 204 can provide the global broker 202 with information relating to device clusters (212). For instance, the network data information provided to the global broker 202 may include an identification of each source cluster and destination cluster on the network.

The network transmission information may also designate each transmission with different priorities. For example, transmissions that are latency tolerant may be designated as low priority, while transmissions that are latency sensitive may be designated as high priority. In addition, a network transmission may be designated as either enforced or unenforced. Enforced data will be subject to the bandwidth enforcement scheme, while unenforced data will be exempt. Network transmissions might be designated as unenforced when they fall below a predetermined bandwidth threshold. The network transmission information may also include an indication of the transmission route that will be taken. For example, if the network contains multiple backbones, the transmission information may indicate which backbone the transmission will take.

The network transmission information may be expressed in the form of principal components, or unique variables, that utilize each of the transmission designations provided above, thereby creating different "principals" depending on the variables that are being determined. For example, a "cluster principal" may be expressed by the following variables: <source cluster, destination cluster, transmission route, priority, enforced/unenforced>. Therefore, each cluster principal will contain a unique combination of these five variables. As described below, other network "principals" can be created by creating combinations of different component variables.

For each separate cluster principal, the site broker 204 passes to the global broker 202 the bandwidth usage and a utility function that summarizes the bandwidth demand and provides the relative weight at which the demand is being requested by the users (212). The global broker 202 then implements the network sharing policies selected by the network administrators. The utility functions and network sharing policies are explained in detail below.

The global broker 202 may also be configured to maintain a network model that represents the current topology of the network. The network model, as well as the usage and demand information, may be used by the global broker 202 to detect congested links within the network. In turn, the global broker 202 may compute bandwidth limits for each cluster principal and divide up the available bandwidth between the various cluster pairs. Preferably, the global broker 202 pass down the bandwidth limits to the site broker 204 on a periodic basis (214). In one example, this may be on the order of every 10 seconds. In other examples, this exchange of information may occur at other regular or preset intervals, such as every 1-15 seconds, every 1-15 minutes, or upon a predetermined condition, which may be a network triggered event. This way, the system may provide bandwidth allocations based on current network demands.

Site brokers 204 desirably run at each network site or point of presence ("POP"). It is the site brokers 204 that receive, via transmission 214, the bandwidth limits from the global broker 202. The site brokers 204 also periodically distribute, via transmission 218, the bandwidth for each user and job among the job shapers 206. Preferably, this distribution occurs on the order of every 10 seconds. In other examples, this exchange of information may occur at other regular or preset intervals, such as every 1-15 seconds, every 1-15 minutes, or upon a predetermined condition, which may be a network triggered event.

Specifically, the site broker 204 receives, via transmission 214, the cluster principal bandwidth limits from the global broker 202 and divides the received bandwidth limits into user bandwidth limits in accordance with a user principal. The user principal comprises the identification of the user, the transmission's source cluster, the transmission's destination cluster, as well as the transmission's Differentiated Services Code Point ("DSCP"). It is the DSCP that contains the QoS guarantees and related network preferences. In dividing a particular user's bandwidth among different jobs, the site broker 204 uses a job principal that is provided by the job shapers 206, via transmission 216. The job principal comprises the same variables as the user principal, but also desirably includes the identification of a particular job that is being run by the network's user. Accordingly, the site broker 204 will aggregate each of the job principals so as to create the user principal. The site broker 204 may then aggregate the user principal information into the form of a cluster principal and provide the cluster principal to the global broker 202, via transmission 212. Preferably, the site broker 204 will provide the global broker 202 with usage reports that include the cluster principal demands, e.g., on the order of every 10 seconds. In other examples, this exchange of information may occur at other regular or preset intervals, such as every 1-15 seconds, every 1-15 minutes, or upon a predetermined condition, which may be a network triggered event.

The job shapers 206 run at each network cluster and are responsible for dividing up the job level bandwidth limits among tasks associated with those jobs and providing these limits to the host shapers 208, via transmission 222. Preferably, the job shapers 206 distribute the bandwidth limits on the order of every 5 seconds. In other examples, this exchange of information may occur at other regular or preset intervals, such as every 1-15 seconds, every 1-15 minutes, or upon a predetermined condition, which may be a network triggered event. The distribution is desirably work-conserving, in that any bandwidth not used by a task should be redistributed to other tasks. The job shapers 206 also periodically report job level bandwidth usage to the site brokers 204, via transmission 216. Preferably, these periodic bandwidth reports occur on the order of every 10 seconds. In other examples, this exchange of information may occur at other regular or preset intervals, such as every 1-15 seconds, every 1-15 minutes, or upon a predetermined condition, which may be a network triggered event. In performing this function, the job shapers 206 receive a task principal bandwidth usage and demand provided from the host shapers 208. The task principal contains the same variables as the job principal, but desirably also includes an identification of the each task that is implemented for a job. Accordingly, task principals may be configured to contain the following principal components: <user, job, task, source cluster, destination cluster, DSCP>.

Host shapers 208 may run on every host in the network, although this is not required. When a host device transmits data over the network, the transmission packets may be categorized by the individual processes, or tasks, that the host is running. The identification of each task may be performed by a kernel 340, such as a Linux kernel, running on the host device. The kernel 340 thereby allows the system to map each network connection, such as TCP connection, of the host device to a corresponding task and user. It is the host shapers 208 that periodically report this task usage information to the job shapers 206, via transmission 220, and it is the host shapers 208 that enforce the bandwidth limits provided by the job shapers 206, via transmission 222, on the individual hosts. The periodic task usage reports preferably occur on the order of every five seconds. In other examples, this exchange of information may occur at other regular or preset intervals, such as every 1-15 seconds, every 1-15 minutes, or upon a predetermined condition, which may be a network triggered event. Each task transmitted on the network is classified at a particular host based on the identification of the remote cluster with which the transmission is occurring, the end user, as well as the DSCP of that transmission. For each remote cluster and DSCP pair, the bandwidth usage is measured and throttled using a token bucket algorithm.

Each host shaper 208 may be configured to perform numerous functions. For example, the host shaper 208 can manage a map of the network cluster names to their Internet Protocol ("IP") subnets. Each host shaper 208 can also run periodic checks for new inter-cluster traffic on the network and, in turn, create new traffic-control classes. The tree of traffic control classes can then be divided and managed by the host shaper 208. Divisions of the traffic control classes can be made based on the following principal components: <local task, remote cluster, DSCP>. The host shaper 208 may also be configured to perform other traffic optimization functions, such as creating a fast path for particular intra-cluster network traffic and to prioritize upstream acknowledgements of response ("ACK's").

In addition, the host shaper can perform throughput threshold checks at each host and create token buckets for network transmissions. A token bucket is a control mechanism that determines when traffic can be transmitted, based on the presence of tokens in an abstract bucket. The bucket contains tokens, each of which can represent a unit of bytes or a single packet of predetermined size. A network administrator may specify how many tokens are needed to transmit a particular number of bytes. When tokens are present, a flow is allowed to transmit traffic. If there are no tokens in the bucket, a flow is not allowed and packets are not transmitted. Other known mechanisms for determining when traffic is to be transmitted may alternatively be used. In response to input from an upstream job shaper 206, the host shaper 208 may also update the limits on the token buckets. Token buckets that have become inactive can be discarded. In one example, each token bucket can be configured to allow an average bit-rate R with a burst-size of B seconds. At any given rate R and burst B, a period of inactivity B will trigger the traffic to be allowed to burst at line-rate, or data transmission speed, equal to a total volume of R*B bits and a sustained rate of R can be achieved in absence of idleness.

Bandwidth throttling can occur in any number of existing ways. For example, in-kernel throttling can be implemented using a Linux HTB packet scheduler and packet classifiers. It should be noted that for TCP, it is possible to always throttle the bandwidth on the client side of the transmission. However, such a process will often require large client side buffering when a network client is pulling a large amount of data. Accordingly, it may be preferable to throttle the bandwidth on the side of the network that is sending the data.

The bandwidth enforcer system may also include a network model cluster reporter ("cluster reporter") module 210 that may run in each network cluster and perform traceroute operations to some or all other clusters on the network. The cluster reporter 210 aggregates the traceroute data and reports it to the global broker 202, via transmission 224. In return, the cluster reporter 210 receives from the global broker 202, via transmission 226, a list of all known clusters on the network. The cluster reporter 210 can also be configured to periodically send traceroute commands to the job shapers 206.

The system 200 is configured to enforce the desired bandwidth allocation policies of the network using, in part, the processes described below. The configurations to enforce the bandwidth allocation policy can include one or more components, such as the following: user weights; manual throttles, permanent allocations, auto-enforcement rules, auto-enforcement thresholds, network model overrides, and cluster lists. A user weight is a numerical value that determines the proportion of bandwidth that a user will receive from the bandwidth enforcer 200. The user weight can depend on the quality of service level for a particular transmission. Accordingly, for each transmission a default user weight and a Quality of Service multiplier (QoS multiplier) is used. The QoS multiplier is a value that sets the quality of service level for the particular types of data transmissions. Accordingly, in one example, the user weight for a given transmission is the default user weight multiplied by the QoS multiplier:

$$user\_weight = default\_user\_weight * QoS\_multiplier$$

For example, suppose user A and user B are both performing data transmission on the network that has been assigned a QoS multiplier of 100. If user A has default user weight of 1, and user B has a default user weight of 1.5, user A's transmission will be assigned an actual user weight of (1.0*100)=100, while user B's transmission will be assigned an actual user weight of (1.5*100)=150. The value of the user weight multiplier or QoS multiplier may depend on any set of factors relevant to determining the importance of a particular network user. For example, users that are working on critical projects, or time sensitive projects, that require large amounts of data may be provided with higher user weight multipliers and higher QoS multipliers than users working on less important projects. It should be noted that the user weight can act as a default setting that can be overridden for specific users, if desired. For example, if a user determines that he or she is not receiving sufficient bandwidth, the user may submit a request for additional bandwidth. This request may be made through the user's network device, and the request may be sent from the device's host shaper 208 to the global broker 202. Dependent on current network usage, or input from network administrators, the global broker 202 may then override the default user weight setting, thereby providing additional bandwidth to the user.

Another configuration component used by the bandwidth enforcer system 200 is a permanent allocation ("PA"). PA's can be used to reserve bandwidth on the network for important user transfers. Accordingly, PA's may be given the highest priority in the system's allocation policy. The system can designate a PA reservation based on the principal components of user, source cluster, destination cluster, and QoS value. For example, the global broker 202, can be configured so that 2 Gbps of bandwidth are reserved for user A, provided that user A attempts to send data from Cluster B to Cluster C using a QoS above a predefined threshold. When user A is not using this reserved bandwidth, it can be temporarily allocated to other users.

Another system configuration component is the Manual Throttle, which specifies a maximum limit on the rate at which a user can send between two network clusters. The Manual Throttle can be designated at the job level ("Job Throttle") or at the user level ("user Throttle"). The user Throttle contains the same principal components as the PA, namely user, source cluster, destination cluster, and QoS level. The Job Throttle uses the same principal components with the addition of a fifth principal component designating a job that is being run by the user.

Yet another configuration component used by the system is an automatic enforcement rule, designating which network transmission flows are to be enforced, and which are to be left unenforced. Each automatic enforcement rule can specify any number of network parameters for exemption from bandwidth enforcement, such as specified transmission paths. The network parameters can include designation of source clusters, destination clusters, users, jobs, or the like, as well as any combination thereof. Likewise, the Automatic Enforcement Rules can designate other network parameters for automatic inclusion in the bandwidth enforcer's allocation policy. In addition, the bandwidth enforcer may implement Auto Enforcement Thresholds that specify the bandwidth usage rate required before a transmission will be subject to the bandwidth enforcer's allocation policy. This threshold can be enforced on the job principal level. For example, an Auto Enforcement Threshold can be set for 5 Mbps, so that each job principal will not be subject to the bandwidth enforcer's allocation policy unless it has a usage rate above the 5 Mbps threshold. Preferably, the bandwidth enforcer will place each job principal that meets the threshold into an auto-enforced bucket, and it will keep the job principal in the auto-enforced bucket for a predetermined period of time, such as fifteen minutes. In other examples, the period may occur at other regular or preset intervals, such as every minute to every hour, or upon a predetermined condition, which may be a network triggered event. This way, network transmissions that intermittently move above and below the threshold will not flip back and forth between an enforced state and an unenforced state. The Auto Enforcement Thresholds can also be set for different threshold levels depending on the transmission route. For example, if the network contains two or more backbones, the bandwidth enforcer can set the threshold of the first backbone to 5 Mbps, while the threshold level for the other backbone(s) can be set to 10 Mbps.

Network model overrides are another configuration component of the bandwidth enforcer system 200. Network model overrides allow for manual overrides for a given link capacity and reservable threshold. The overrides can be expressed as a set of rules contained in an ordered list, with the first matching rule in the list being applied. Separate ordered lists are used for link capacity overrides and reservable threshold overrides. Each link can be specified in the set of rules by identification of the link's source router, destination router, and the interface that is used.

The clusters that are present on the network can be identified on a cluster list. For each cluster, the list can contain the name of the cluster, the site or POP to which it belongs, as well as the subnet in which the cluster exists.

If two users on a network have the same user weights, the bandwidth enforcer system 200 will allocate the same amount of bandwidth, provided that they are sending transmissions having the same QoS from the same source cluster to the same destination cluster. This is not necessarily the case in instances where users are sending transmissions between different cluster pairs. However, it should be appreciated that the bandwidth enforcer system 200 may be configured so as to provide fairness among network users regardless of whether they are transmitting between distinct sources and destinations. In addition, the bandwidth enforcer 200 can be configured to allow a user to lend its user weight value, via a priority token, to another user flow so that the other flow can operate at the original user's priority.

As described above, the bandwidth enforcer system 200 aggregates inter-cluster network usage information from all user devices on the network. This usage information can be extrapolated so as to project or predict bandwidth demands on the network. The bandwidth enforcer can then allocate bandwidth among user devices by incorporating the extrapolated usage information into various bandwidth sharing processes.

The bandwidth enforcer system may implement what can be described as a "waterfill" process, which divides the network's available bandwidth between competing users, jobs, and tasks. For the purposes of the waterfill process, each job principal can be associated with a particular user principal. Accordingly, the job principal can be considered to be a child principal of an associated, parent user principal. Similarly, each task principal can be associated with a job principal and can be considered to be the child principal of that job principal.

Figure 3:
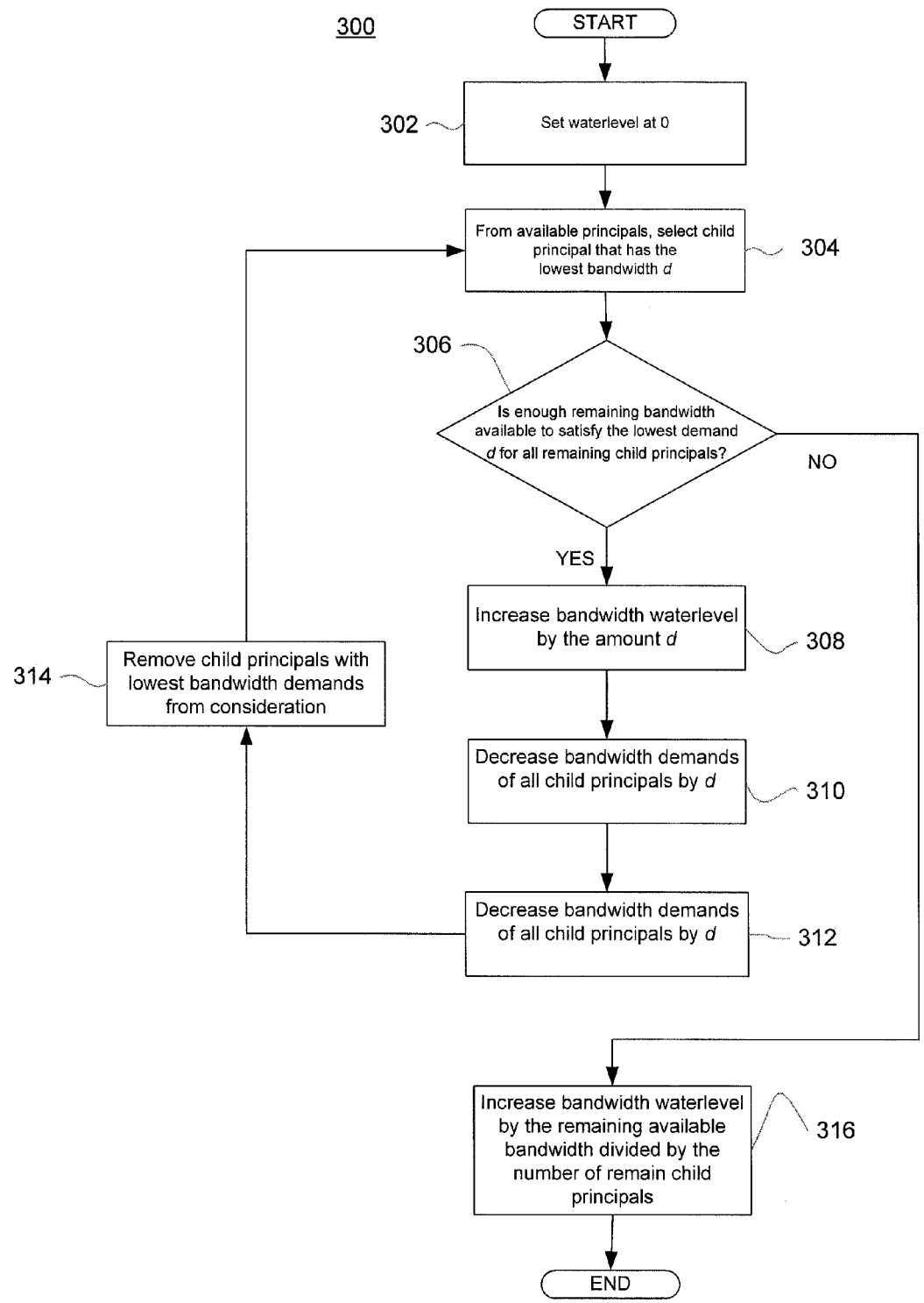
FIG. 3 is a flow diagram in accordance with aspects of the invention.

The waterfill process 300 is illustrated in the flow diagram of FIG. 3. The waterfill process 300 may be performed by any module on the system, but are preferably performed by the site broker 204 or the job shaper 206. The process begins at block 302, with the original bandwidth water level being set at 0. In block 304, the bandwidth enforcer module selects from the available principals, the child principal that has the lowest bandwidth demand d. In block 306, it is determined whether enough remaining bandwidth is available to satisfy the lowest demand for all remaining child principals. If the answer to block 306 is "yes", the process proceeds to block 308, wherein the bandwidth water level is increased by the amount d. Then, in block 310, the bandwidth demands of all children are decreased by the amount d. In block 312, the available bandwidth is decreased by (d*number of remaining child principals). Then, in block 314, the lowest demand child principal previously selected in block 304 is removed from future consideration, and the process returns back to block 304. If the answer to block 306 is "No", the process proceeds to block 316, wherein the water level is increased by the remaining bandwidth divided by the number of remaining children. Upon completing the waterfill process 300, the bandwidth limit for all principals that satisfied block 306 will be equal to the demand for that principal. For all other principals, the limit will be equal to the water level as set by the last iteration of block 308. In this way, the waterfill process divides the available bandwidth between all competing principals in a max-min fair manner, meaning that the minimum data rate that a dataflow achieves is maximized.

The site brokers 204 can summarize bandwidth demands for network users by creating a utility function. More specifically, a single utility function can act as a representation of the bandwidth demand of multiple users that are sending data between the same pair of network clusters. The utility function can also take into account the user weights and the PA's granted to each user, as described above.

Figure 4:
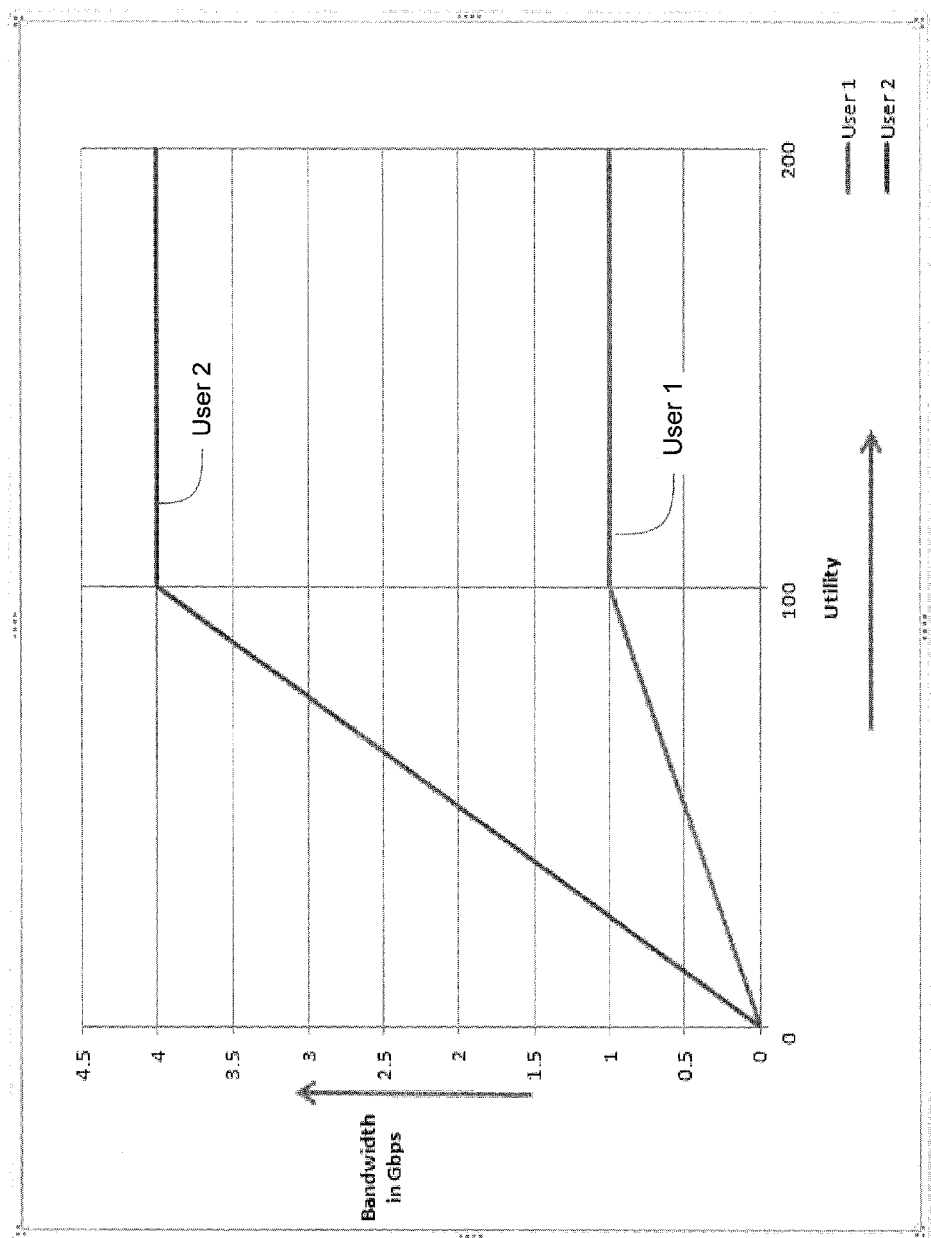
FIG. 4 is a graph demonstrating bandwidth allocation in relation to a utility value.

FIG. 4 illustrates the utility functions for two users, user 1 and user 2, each of whom has a different PA. In this example, user 1 has been assigned a PA of 1 Gbps, while user 2 has been assigned a PA of 4 Gbps. The scale of the utility values provided in FIG. 4 can be arbitrarily set, as it is only their relative values that are determinative. For the purpose of this example, the utility functions will run between values of 0 and 200. Given that PA's are designated with the highest priority during bandwidth sharing, the utility function reserves utility values between 0 and 100 solely for PA's. The rest of the user demands are summarized in the utility space between 100 and 200. As shown in FIG. 4, both PA's are completely satisfied at a utility of 100 and above. For a utility value of less than 100, each user is granted a bandwidth in proportion to their PA's.

Figure 5:
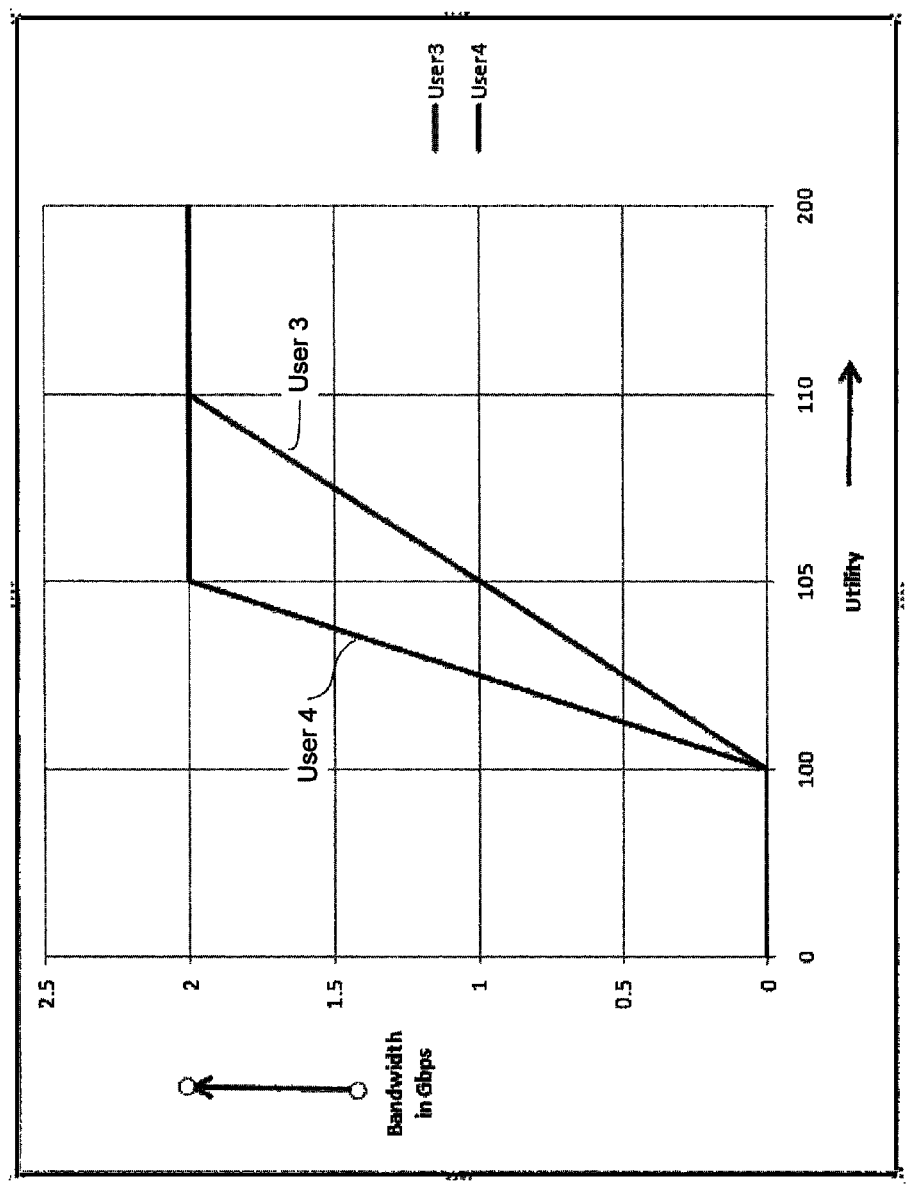
FIG. 5 is a graph demonstrating bandwidth allocation for users with different weight values in relation to a utility value.

For user demand beyond the user's granted PA, bandwidth is allocated in proportion to user weights. FIG. 5 illustrates the utility functions for two users who are each are requesting 2 Gbps of bandwidth. In this example, the two users have not been assigned any PA, therefore they have no bandwidth granted to them for utility values of 100 and below. However, for utility values over 100, the system has been configured to assign user 4 a weight of 0.4, while user 3 has been assigned a lower user weight of 0.2. Accordingly, user 4's demands are granted at a lower utility value than the demands of user 3.

Figure 6:
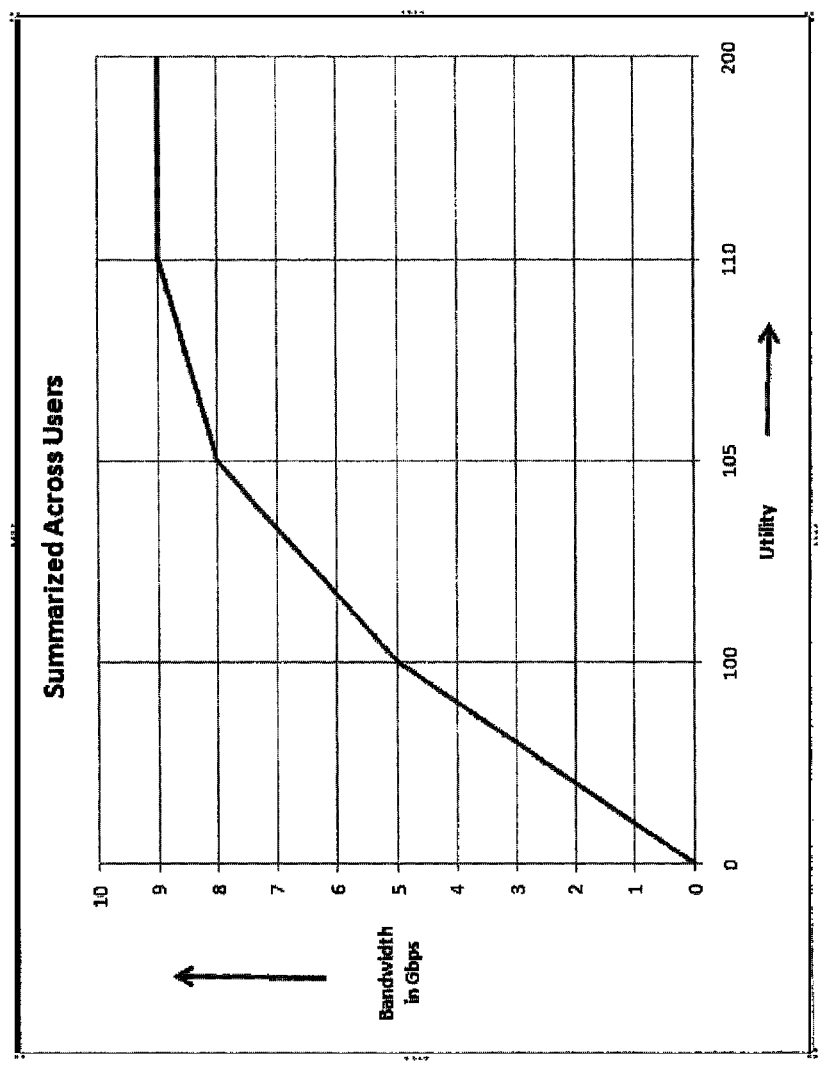
FIG. 6 is a graph demonstrating a summarized bandwidth allocation in relation to a utility value.

The site brokers 204 can create utility functions for the bandwidth demand of each user principal. It can then summarize the user principal demands for the same cluster pair into a single utility function, called a summarized utility function. FIG. 6 illustrates a Summarized utility function for user 1, user 2, user 3, and user 4. As shown in FIG. 6, the summarized utility function is simply a linear addition of the bandwidth demands for each user's individual utility functions, as provided in FIGS. 4 and 5.

Figure 7:
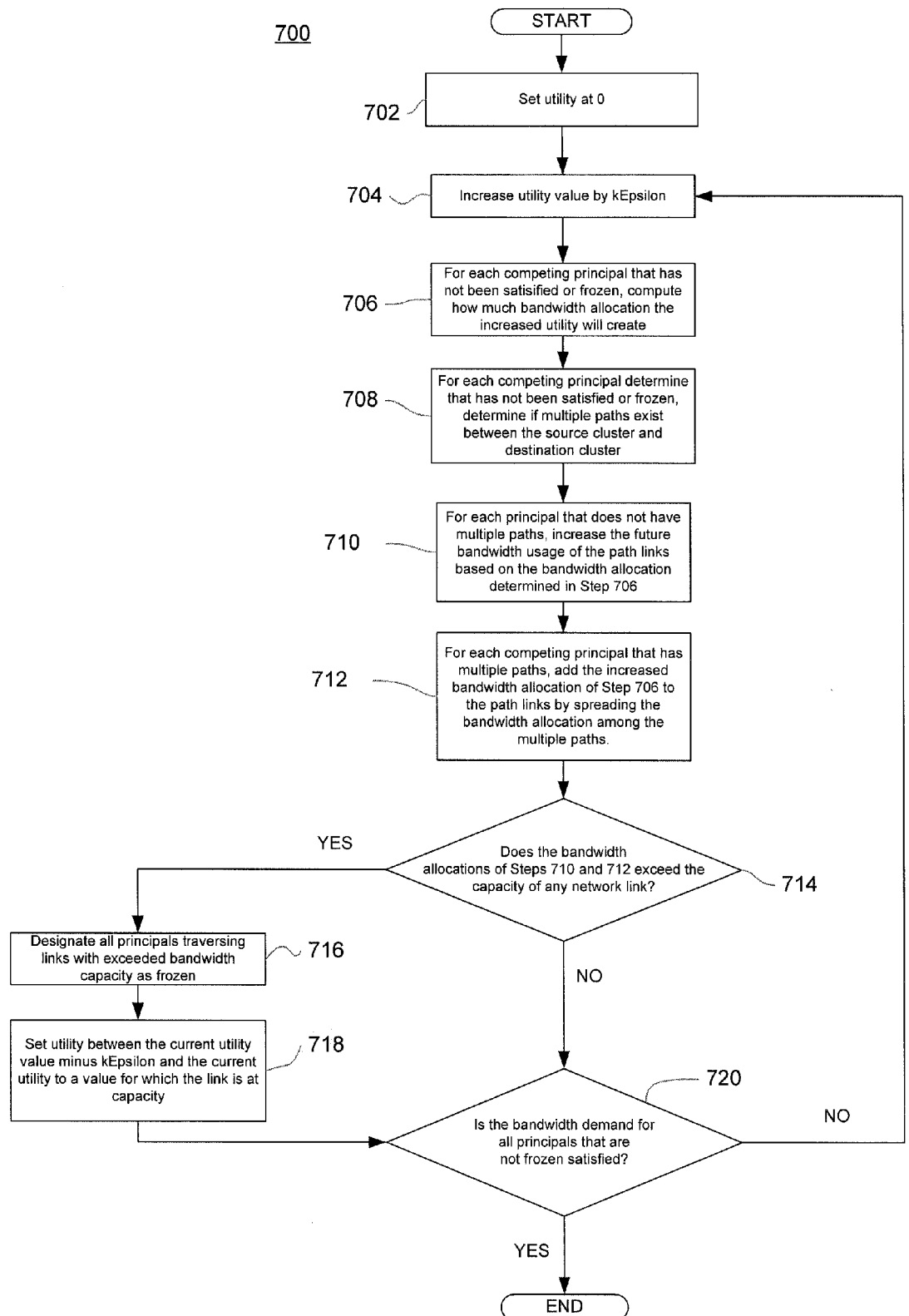
FIG. 7 is a flow diagram in accordance with aspects of the invention.

The system may determine how to divide available network bandwidth between competing principals by implementing a progressive filling process that incorporates the utility functions of the network users. An exemplary progressive filling process 700 is illustrated in FIG. 7. Beginning at block 702, the initial utility is set to the value 0. In block 704, the utility value is increased by an amount kEpsilon. For each competing principal that has not been satisfied or frozen, the utility function of the principal is used to compute how much bandwidth allocation the increased utility will create (block 706). Then, the process determines if there are multiple paths between each source cluster and destination cluster identified in the competing principals (block 708). If there is only a single path, the future bandwidth usage of the path's links is increased at block 710 based on the bandwidth allocation determined in block 706. If multiple paths between the source cluster and destination cluster exist, the increased bandwidth allocation of block 706 is added to the network links by spreading the bandwidth allocation among the multiple paths (block 712). It should be noted that each path can be weighted by different multiplication factors, so if multiple paths exist, the allocation among each path will be in proportion to the path's relative weight. In block 714, the process determines if the bandwidth allocations of blocks 710 and 712 exceed the capacity of any network links. If there are no links that exceed capacity, the process returns to block 704. If the capacity of a network link is exceeded, that link is designated as a bottleneck and all principals that traverse the bottleneck link are frozen, meaning that they cannot be allocated any more bandwidth (block 716). A binary search is then performed between the current utility value ("CUV") minus kEpsilon (CUV −kEpislon) and the current utility value (CUV) to determine the utility value for which the link capacity is not exceeded (block 718). The process, starting at block 704, is repeated until all of the principals are either frozen or have had their bandwidth demand satisfied (block 720).

In many instances, the network will transmit data that is exempt from management by the bandwidth enforcer system. In allocating bandwidth between competing cluster principals, the global broker 202 adjusts for the available capacities of the logical interfaces for all such unmanaged traffic. For example, assume that a logical interface has 10 Gbps in available capacity, and that the current utilization is 8 Gbps. If only 5 Gbps of the utilization is manageable, the global broker will subtract the other 3 Gbps from the available bandwidth. Thereby creating an effective capacity of 7 Gbps for that logical interface.

Once the unmanaged bandwidth is accounted for, the progressive filling process can be used to allocate bandwidth among the competing cluster principals. In performing this process, the site broker 204 passes to the global broker 202, the utility functions that contain the summarized demand for each cluster principal. These utility functions are computed by the site broker 204 from the utility functions for each individual user principal at that cluster. The system may be configured to provide manual throttles for some user principals. For these user principals, the site broker 204 can cap the bandwidth demand by the throttle value, meaning that those principals cannot be allocated for more bandwidth than the configured throttle value. If bandwidth is still available after running the progressive fill process, the remaining bandwidth can be divided up among the user principals as a bonus bandwidth. Given that some of the user principals will not use the assigned bonus, the bonus bandwidth can be over-subscribed by a configurable scaling factor. For example, each user may be assigned a scaling factor between one and ten, and the bonus bandwidth may be allocated in proportion to the scaling factor.

As previously described, the global broker 202 provides site brokers 204 with the bandwidth limit for each cluster principal. The site brokers 204 can then look up the summarized utility function for each cluster principal and determine the utility value corresponding to the assigned bandwidth limit. This utility value can be referred to as the master rate, and can be used to look up the bandwidth limit for each user principal in the user principal utility function. If the global broker 202 has assigned a bonus bandwidth to the cluster principal, this bonus bandwidth can be divided up among the user principals.

In order to construct the utility function for a user principal, the site broker 204 determines what the bandwidth demand is for that user principal. This may be done by selecting the peak user principal bandwidth usage over a recent period, such as the last two minutes. In order to assure adequate bandwidth allocation, the site broker may multiply the user principal's peak usage by a predetermined factor, such as 1.1, to create a slightly higher Peak user principal demand. In other alternatives, the peak usage scaling factor may run between 1 and 1.5. For some users, the bandwidth enforcer system 200 may be configured to provide a manual throttle. For these users, the bandwidth demand is capped by the throttle value. In addition, these users are not assigned bonus bandwidth beyond the throttle value. This way, the bandwidth allocated to these users will not exceed the configured throttle settings.

The site broker 204 can then divide the bandwidth limit assigned to a user principal among its constituent job principals by implementing the waterfill process on the various job principals. If any bandwidth is still remaining after the waterfill process is performed, it can be divided among the job principals as bonus bandwidth. Given that some of the job principals will not use the assigned bonus, the bonus bandwidth can be over-subscribed by a configurable scaling factor. For example, each job may be assigned a scaling factor between one and ten, and the bonus bandwidth may be allocated in proportion to the scaling factor. In determining the bandwidth demand to be used in the waterfill process, for each job, the site broker 204 may use the peak demand that has occurred over a recent period of time, such as two minutes. In other examples, the period for determining peak demand may be set at other intervals, such as 1-15 minutes, or upon a predetermined condition, which may be a network triggered event. Given that different jobs will peak at different times, the system can scale up the total bandwidth limit for the user principal. The scaling factor being equal to the sum of the peak job principal demands divided by the Peak user principal demand. For some jobs, the system may have a configured manual throttle. In this instance, the demand at the waterfill process is capped by the throttle value. Similarly, these jobs are not assigned bonus bandwidth beyond the throttle value.

Once the site broker 204 has assigned bandwidth limits to the job principals, the job shapers 206 can then divide the assigned job principal bandwidth among the constituent Task Principals. This function is performed by implementing a modified version of the waterfill process 30 on the various Task Principals. Given that tasks for a job are bursty and that different tasks can burst at different times, the same bandwidth limit is assigned to each task. This limit is equal to the waterlevel when the process is terminated. In determining the bandwidth demand to be used in the waterfill process 30, for each task, the site broker 204 can use the peak demand that has occurred over a recent period of time, such as two minutes. Given that different tasks will peak at different times, the system may scale up the total bandwidth limit for the job principal. The scaling factor being equal to the sum of the peak Task Principal demands divided by the Peak job principal demand.

The system may be configured to prevent a sudden burst of traffic during periods of bandwidth ramp up triggered by the bandwidth enforcer 200. For example, a gradual ramp up of increased bandwidth allocation can be implemented for different tasks so as to prevent any synchronous bursts. In addition, the system may be configured so that network users can know if their job is being throttled by the system. Accordingly, a view can be made available for every network flow, identified by the user, source cluster, destination cluster, and QoS. This view can be made at the link level along the transmission's path. The system may also be configured so as to allow users to dedicate more of its resource quota to important jobs or tasks and leave less resources for less important jobs or tasks. This can be performed by allowing users to assign weight values to individual jobs and tasks. The system may also contain redundant components so as to allow for continued operation, even if a particular component is malfunctioning or unreachable. For example, the system may contain multiple global brokers 202 running in different portions of the network. At any given time, only one global broker 202 will be designated as "live". The site brokers 204 may report information to, and receive information from, every global broker 202 in the network. However, the site brokers 204 will only accept the bandwidth limits that are provided by the live global broker 202. Redundancies may also be implemented for the site brokers 204 and the job shapers 206.

Figure 8A:
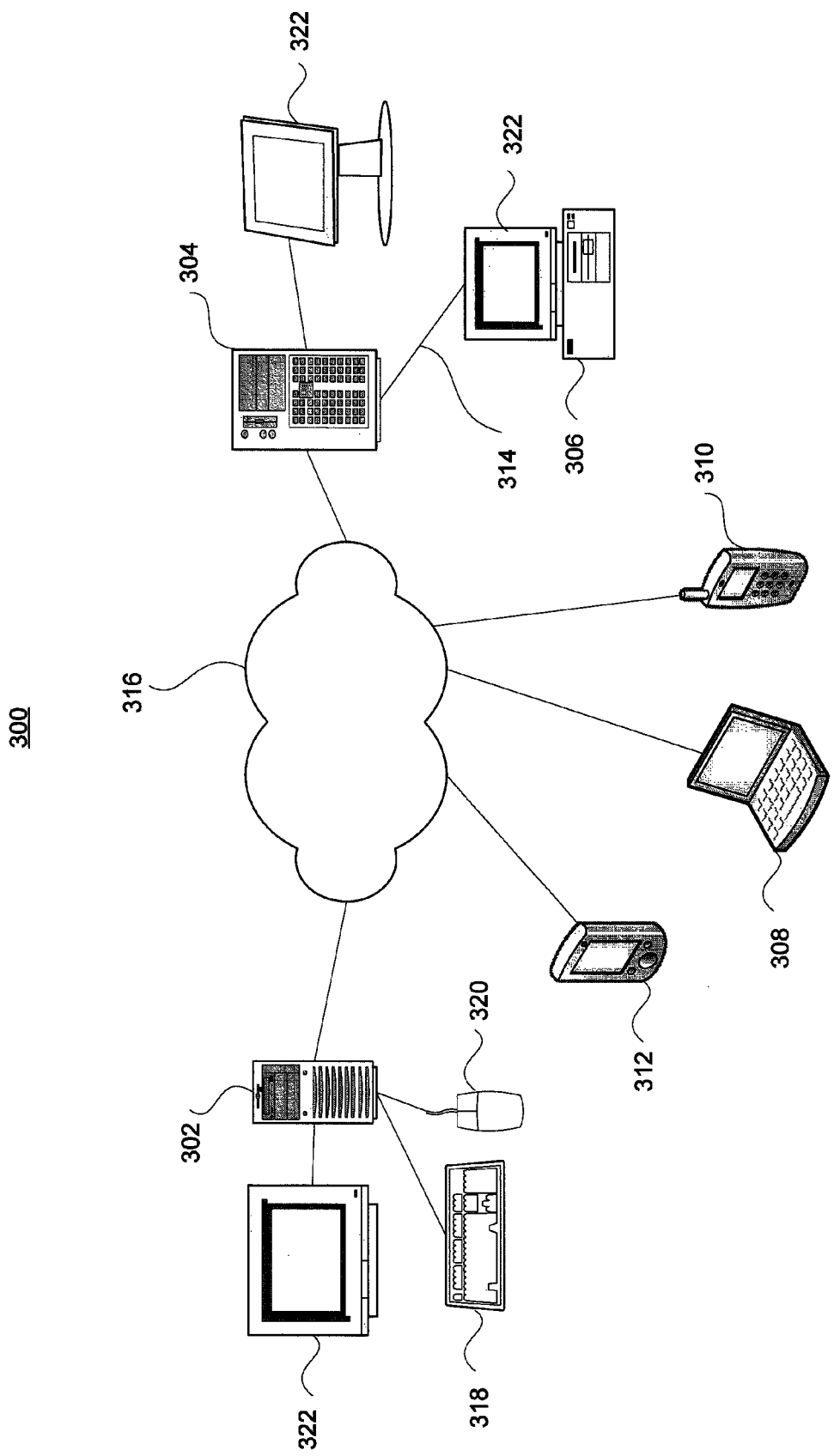
FIGS. 8A-B illustrate computer systems for use in the invention.

The system according to aspects of the invention may be implemented with the following exemplary computer system. FIG. 8A presents a schematic diagram of a computer system depicting various computing devices that can be used alone or in a networked configuration. For example, this figure illustrates a computer network 300 having a plurality of computers 302, 304, 306 and 308 as well as other types of devices such as portable electronic devices such as a mobile phone 310 and a PDA 312. However, the invention is not so limited, and other devices including netbooks and pad-type handheld computers (not shown) may also be used. Such devices may be interconnected via a local or direct connection 314 and/or may be coupled via a communications network 316 such as a LAN, WAN, the Internet, etc., and which may be wired or wireless.

Each device may include, for example, one or more processing devices and have user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 306 and 308 may be a personal computer, server, etc. By way of example only, computers 302 and 306 may be personal computers while computer 304 may be a server and computer 308 may be a laptop.

Figure 8B:
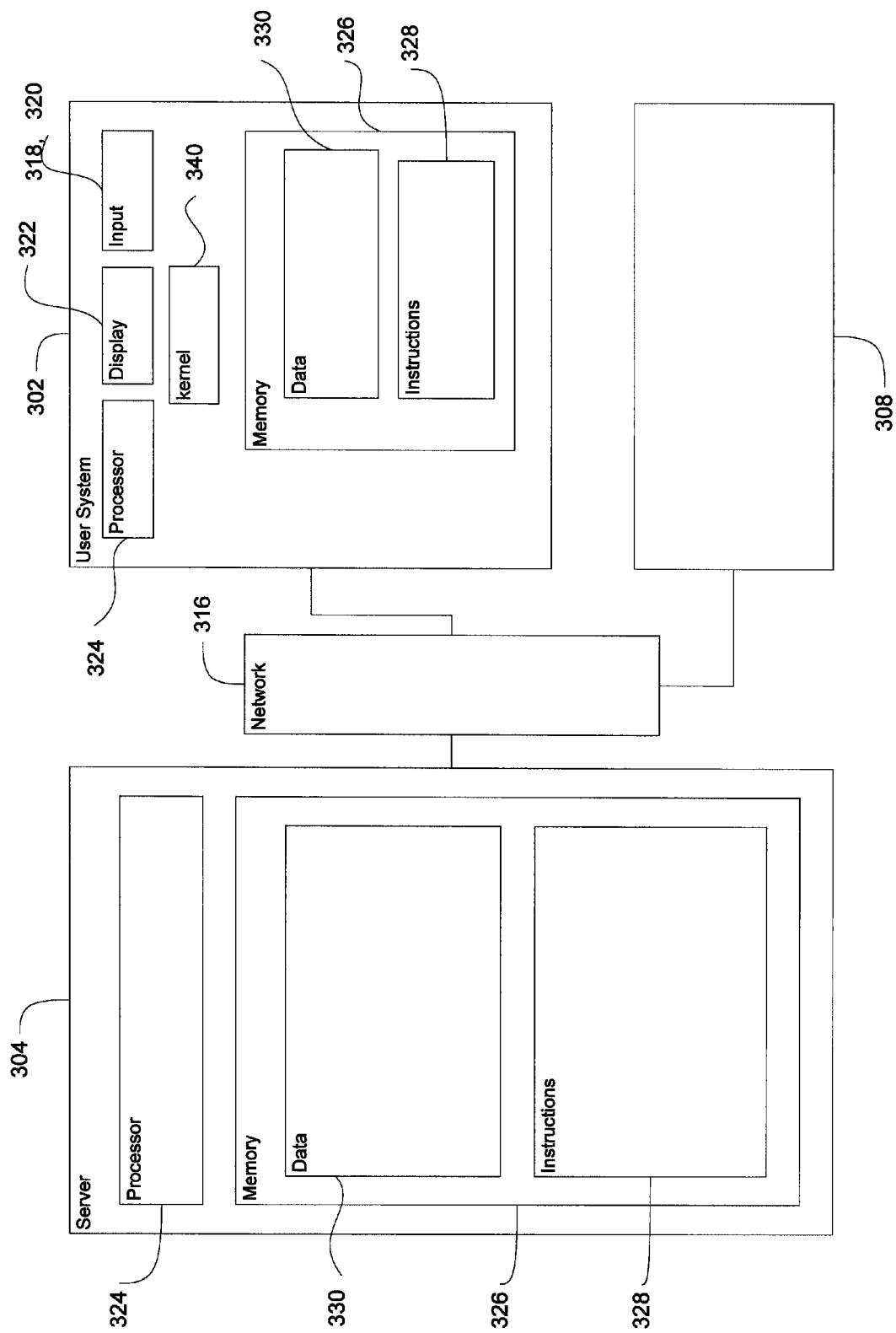

As shown in FIG. 8B, each computer such as computers 302 and 304 contains a processor 324, memory/storage 326 and other components typically present in a computer. For instance, memory/storage 326 stores information accessible by processor 324, including instructions 328 that may be executed by the processor 324 and data 330 that may be retrieved, manipulated or stored by the processor. The instructions 328 at the server may include operations associated with one or more of the modules in the current system, such as the global broker 202 or site broker 204. The instructions 328 at the user system may include operations associated with one or more of the modules, such as the job shaper 206 and host shaper 208.

The memory/storage may be of any type or any device capable of storing information accessible by the processor, such as a hard-drive, ROM, RAM, CD-ROM, flash memories, write-capable or read-only memories. The processor 324 may comprise any number of well known processors, such as processors from Intel Corporation or Advanced Micro Devices. Alternatively, the processor may be a dedicated controller for executing operations, such as an ASIC or other processing device.

The instructions 328 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 330 may be retrieved, stored or modified by processor 324 in accordance with the instructions 328. The data may be stored as a collection of data. For instance, although the invention is not limited by any particular data structure, the data may be stored in computer registers, in a relational database as a table having a plurality of different fields and records, in a web page cache, as XML documents, etc.

The data may also be formatted in any computer readable format such as, but not limited to, binary values, ASCII or Unicode. Moreover, the data may include any information sufficient to identify the relevant information, such as descriptive text, proprietary codes, pointers, references to data stored in other memories (including other network locations) or information which is used by a function to calculate the relevant data. Furthermore, a given item may comprise one or more files, a data set stored in a database, a web cache, etc. Depending on the size and content of the data, parts thereof may be stored or otherwise maintained separately.

Although the processor 324 and memory 326 are functionally illustrated in FIG. 8B as being within the same block, it will be understood that the processor and memory may actually comprise multiple processors and memories that may or may not be stored within the same physical housing or location. For example, some or all of the instructions and data may be stored on a removable CD-ROM, DVD-ROM or flash drive, and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 304 may communicate with one or more client computers 302, 306 and/or 308, as well as devices such as mobile phone 310 and PDA 312. Each client computer or other client device may be configured similarly to the server 304, with a processor, memory and instructions, as well as one or more user input devices 318, 320 and a user output device, such as display 322. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 304, user computers and other devices are capable of direct and indirect communication with other computers, such as over network 316. Although only a few computing devices are depicted in FIGS. 8A-B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network, including any intervening nodes, may be facilitated by any device capable of transmitting data to and from other computers, such as modems (e.g., dial-up or cable), network interfaces and wireless interfaces. Server 304 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, certain information may be transmitted in a non-electronic format and manually entered into the system.

Moreover, computers and user devices in accordance with the systems and methods described herein may comprise any device capable of processing instructions and transmitting data to and from humans and other computers, including network computers lacking local storage capability, PDA's with modems such as PDA 312, Internet-capable wireless phones such as mobile phone 310, netbooks and pad-type handheld computers.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of allocating bandwidth over a network, the method comprising:
    receiving bandwidth usage information that is representative of a plurality of network users;
    classifying the plurality of network users, wherein classifying includes assigning each network user with a default weight value from a plurality of default weight values, the default weight value being in accordance with a predetermined set of one or more network criteria, at least one of the network criteria being independent of specific data transmissions for which bandwidth is to be allocated;
    determining a transmission quality value that indicates a quality of service for which the data transmissions are to be transmitted;
    calculating, for at least one of the plurality of network users, an adjusted weight value that is proportional to both the default weight value of the at least one of the plurality of network users and the transmission quality value of the data transmission;
    performing operations with a processor to create bandwidth allocations, the bandwidth allocations being based on the bandwidth usage information and the adjusted weight value; and
    transmitting the bandwidth allocations to network devices that correspond to the plurality of network users.

2. The method of claim 1, wherein the operations performed with the processor include:
    aggregating bandwidth usage information to determine the network's total bandwidth demand;
    detecting congested links within the network; and
    dividing available bandwidth of the network between the plurality of network users.

3. The method of claim 1, further comprising dividing the bandwidth allocations among the plurality of network users.

4. The method of claim 2, further comprising dividing the bandwidth allocations of the plurality of network user among jobs being performed for at least one of the plurality of network users.

5. The method of claim 4, further comprising dividing the bandwidth allocations of each job among a plurality of tasks associated with each job.

6. The method of claim 1, wherein the bandwidth usage information is based on a peak bandwidth usage of the plurality of network users over a predetermined time period.

7. The method of claim 1, further comprising:
    determining that all network bandwidth demand is being met;
    determining that unused bandwidth is available on the network; and
    dividing the unused bandwidth among the plurality of network users in proportion to the default weight values.

8. The method of claim 1, wherein a portion of network bandwidth remains exempt from the operations to create bandwidth allocations.

9. The method of claim 1, wherein a portion of network transmissions remain exempt from the operations to create bandwidth allocations.

10. A method of allocating bandwidth over a network, the method comprising:
    identifying user weight values for network users, the user weight values being based on one or more network criteria of the network users, at least one of the network criteria being independent of specific data transmissions of the network users;

receiving bandwidth usage information regarding a plurality of jobs running on the network, wherein each job is associated with a given one of the network users and includes one or more tasks to be performed over the network;

determining a transmission quality value that indicates a quality of service for which the data transmissions are to be transmitted;

calculating, for at least one network user, an adjusted weight value that is proportional to both the user weight value of the at least one network user and the transmission quality value of the data transmission;

determining a bandwidth demand for each network user, wherein the bandwidth demand is based at least in part on the adjusted user weight value; and dividing bandwidth among the network users and jobs based on the received bandwidth allocations and the bandwidth usage information.

11. The method of claim 10, wherein the bandwidth demand includes bandwidth that is permanently allocated to one or more network users.

12. The method of claim 10, wherein the determining of bandwidth demand includes aggregating the bandwidth demand of a plurality of network users into a single demand function.

13. The method of claim 10, wherein each network user is associated with a network cluster and wherein the transmitting of the bandwidth demand includes providing the bandwidth demand of a network cluster.

14. The method of claim 10, further comprising dividing the bandwidth of each job among a plurality of tasks.

15. A method for allocating bandwidth, the method comprising:

receiving bandwidth usage information representing network bandwidth that is used for a plurality of network users to send data transmissions over one or more data links on a network, wherein the data links have a maximum transmission capacity, and wherein the plurality of network users are assigned weight values in accordance with a predetermined set of one or more network criteria, at least one of the network criterion being independent of specific data transmissions for which bandwidth is to be allocated;

calculating, for at least one of the plurality of network users, an adjusted weight value that is proportional to both the weight value of the at least one of the plurality of network users and a transmission quality value of the data transmission;

accessing a bandwidth demand function for the plurality of network users, wherein the bandwidth demand function indicates an amount of bandwidth that would be allocated to the plurality of network users at each of a plurality of network utility values, and wherein the bandwidth demand function is based at least in part on the adjusted weight values of the plurality of network users;

determining, based on the bandwidth demand function, that there is a maximum utility value for which an increase in the utility value over the maximum utility value would cause the transmission capacity of one or more of the data links to be exceeded; and allocating bandwidth to the plurality of network users based on an amount of bandwidth indicated by the bandwidth demand function at the maximum utility value.

16. The method of claim 15, further comprising, dividing the bandwidth allocated to the plurality of network users based on the adjusted weight values of the network users.

17. The method of claim 15, wherein the bandwidth demand function includes permanent allocations of bandwidth for one or more of the plurality of network users.

18. The method of claim 15, wherein the data transmissions are assigned quality of service values, and wherein the bandwidth demand function is based in part on the assigned quality of service values.

19. The method of claim 1, wherein the adjusted weight value is calculated by multiplying the default weight value with the transmission quality value.

* * * * *